United States Patent [19]

Anouar et al.

[11] Patent Number: 4,689,759

[45] Date of Patent: Aug. 25, 1987

[54] PROCESS AND INSTALLATION FOR THE ANALYSIS AND RETRIEVAL OF A SAMPLING AND INTERPOLATION SIGNAL

[75] Inventors: Driss Anouar, Paris; Jean-Francois Hamelin, Chatou, both of France

[73] Assignee: Electricite de France, France

[21] Appl. No.: 628,283

[22] Filed: Jul. 6, 1984

[30] Foreign Application Priority Data

Jul. 7, 1983 [FR] France ................................ 83 11357

[51] Int. Cl.⁴ ..................... H04B 15/00; H04B 14/04; G06F 7/38
[52] U.S. Cl. .................................. 364/572; 364/724; 364/574; 364/577; 375/26; 381/94
[58] Field of Search ............... 364/572, 574, 724, 723, 364/577; 381/94; 375/26, 33

[56] References Cited

U.S. PATENT DOCUMENTS

| | | | |
|---|---|---|---|
| 4,199,660 | 4/1980 | Dill et al. ........................... | 370/23 X |
| 4,231,097 | 10/1980 | Shibayama et al. ................ | 364/577 |
| 4,253,072 | 2/1981 | Fisher et al. ....................... | 381/94 X |
| 4,270,026 | 5/1981 | Shenoi et al. ..................... | 364/723 X |
| 4,270,027 | 5/1981 | Agrawal et al. ................... | 179/81 R |
| 4,323,885 | 4/1982 | Carriere et al. ................... | 375/26 X |
| 4,354,243 | 10/1982 | Ryan et al. ....................... | 364/723 X |
| 4,356,507 | 10/1982 | Goldberg et al. ................. | 375/26 X |
| 4,428,059 | 1/1984 | Gessert ............................... | 364/577 |
| 4,460,890 | 7/1984 | Busby ................................ | 364/723 X |
| 4,493,047 | 1/1985 | Werst ................................. | 364/724 |
| 4,497,035 | 1/1985 | Yabuuchi et al. ................. | 364/723 X |
| 4,568,912 | 2/1986 | Kitamura et al. ................. | 364/572 X |
| 4,604,720 | 8/1986 | Stikvoort ........................... | 364/724 |

*Primary Examiner*—Errol A. Krass
*Assistant Examiner*—Joseph L. Dixon
*Attorney, Agent, or Firm*—Larson and Taylor

[57] ABSTRACT

To analyze and restore an analog signal by sampling at a frequency between 2.5 and five times the band of the signal and by interpolation, the signals sampled at the rate ($F_e$) is subjected to low pass filtering for isolating the signal band B, then to an interpolation in several steps each leading to multiplication of the samples by inserting zeros between the available samples and by subjecting the new set of samples obtained to digital low pass filtering. The installation for this may comprise an input filter, an A/D converter and an interpolater. The filter isolates the band of the signal then the interpolater operates in several steps each leading to multiplication of the samples by inserting zeros between the available samples and by subjecting the new set of samples obtained to digital low pass filtering.

8 Claims, 15 Drawing Figures

PROCESS AND INSTALLATION FOR THE ANALYSIS AND RETRIEVAL OF A SAMPLING AND INTERPOLATION SIGNAL

BACKGROUND OF THE INVENTION

1. Field of the Invention

The invention relates to the analysis and retrieval of signals. It is usable whenever it is desirable to accurately determine the evolution in time of a signal measured by sampling. It finds a particularly important although not exclusive, application in systems comprising a central measurement unit, provide for effecting filtering, sampling and analog/digital conversion operations, as well as multiplexing in the case of application of several signals, and a computer with terminals for the storage or retrieval of the data in digital (tables of the values of the signals at successive time $t_i$) or graphic form.

2. Prior Art

When high analysis accuracy is required, at the present time a very high sampling rate is adopted so that the variations of the signal between two consecutive sampling times are small. The intermediate points may then be assessed with satisfactory accuracy by linear interpolation or by a low order polynomial function. In the case of retrieval in graphic form, this final interpolation is made by the retrieval apparatus itself which joins the samples together, by straight segments in the most frequent case, by segments of a circle or a sinusoid with high performing apparatus. This approach has the drawback of requiring the collection of a very large amount of data. It is considered that, for a signal having a band B (the band of the signal being defined as the frequency below which is contained 99% of the energy of the signal), the sampling frequency must be greater than 20B for the accuracy to be better than $10^{-2}$ in the case of a linear interpolation. The study of this type of interpolation shows that a good restoration of the signal, even using a polynomial interpolation of an order higher than 2, requires a high ratio, in practice greater than 5, between the sampling frequency and the band of the signal.

As soon as the passband B becomes high, which is the case for rapid transitory signals, the system must have a very high sampling rate, a very high digital transmission rate and, when the retrival is to take place with a time lag, a storage capacity in relation to the preceding rates. The overall cost of the system may consequently become very high.

It is further known (Shannon's theorem) that any point may be calculated between two consecutive samples of a signal with restricted spectrum, of band B, provided that the sampling frequency $F_e$ is greater than the Shannon frequency 2B. Unfortunately, the analytic expression of the signal x(t) as a function of the samples taken only converges very slowly and gives rise to very heavy calculations, which are difficult to apply in practice and practically exclude real time operation. On the other hand, the use of this expression allows, at least in theory, a sampling rate much slower than in the preceding case, very close to twice the band of the signal.

Still other systems have been proposed. They are used for example in certain digital oscilloscopes. They use a moderate sampling rate compared with the band of the signals. But they only allow restoration in the case of sinusoidal or, at all events, periodical signals.

SUMMARY OF THE INVENTION

It is an object of the invention to provide a process and an installation for signal analysis and retrieval answering better than those known heretofore the requirements of practice, particularly in that it allows a sampling rate to be adopted very little greater than the Shannon frequency (practically 2.5 to 5 times the passband) while allowing the accurate restoration of as many points as is required between two effectively recorded samples, and only using relatively simple means for this.

The reduction of the sampling rate with respect to those used up to present for accurate analysis reduces the data to be taken, transmitted and stored, without a corresponding reduction of the accuracy of analysis and without it being necessary to make an assumption about the natureof the signal. Consequently, the cost of the system is reduced, the reduction relating not only to the data aquisition element, which may operate at a lower rate, but also to the means for transmitting data both to the computer and to the possible storage means.

To this end, the invention provides more especially a process for digital signal analysis and retrieval by sampling the signal at a rate very little higher than the Shannon frequency, typically between 2.5 and 5 times the band B of the signal and interpolation, characterized in that the signal sampled at the rate $F_e$ is subjected to low-pass filtering for isolating the signal band B, then to interpolation in several steps each leading to a multiplication of the samples by inserting zeros between the available samples and subjecting the new set of samples obtained to low-pass digital filtering.

An advantageous solution consists in introducing a single zero between two consecutive samples in each step, before filtering the signal thus obtained. Thus, $2^{k-1}$ points may be reconstituted between each pair of original samples. This solution uses a succession of low-pass filters having a relative transition band which may be much greater than in the case where it is desired to carry out the interpolation in a single operation. In addition, these filters operate on a small number of samples. They are then simple to construct and the computing volume required becomes perfectly acceptable.

Putting the process of the invention into practice requires the analog input signal to have a limited band. Since the useful signal is practically always accomplished by noise, it is necessary to filter it so as to remove the frequencies higher than the pass-band B, or at least to attenuate them sufficiently for the background noise to remain acceptable. The low-pass analog filtering required must provide a very linear phase response and have a transition between passband and cut-off band all the steeper the closer that the sampling takes place to the Shannon frequency.

In practice, it will be necessary to use a filter having a high number of poles, and in particular a Bessel Filter or a Butterworth filter may be used. But, in practice, it is not possible to obtain an amplitude response which is perfectly flat in the passband. This imperfection may be offset during the first interpolation step, by an appropriate choice of the coefficients of the digital filter used.

The invention also provides an analysis installation for implementing the above defined process.

The invention will be better understood from reading the following description of particular embodiments thereof, given by way of non limitative examples.

DETAILED DESCRIPTION OF THE PREFERRED EMBODIMENTS

Figure 1:
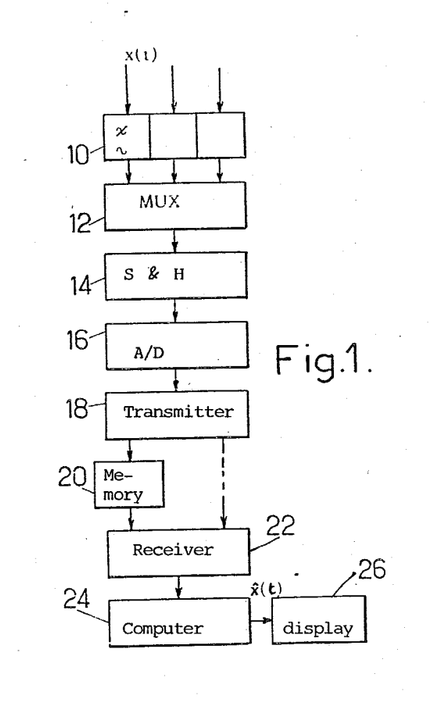
FIG. 1 is a general block diagram showing the construction of a measurement installation to which the invention is applicable.

For the sake of simplicity, and by way of example, it will be assumed that the invention is applied to a measuring installation of the kind shown in FIG. 1, for restoring input signals such as x(t) in digital or analog form. This installation comprises for each input a low-pass filter for excluding, or at least highly attenuating, the noise outside the band B of the signal. This low-pass analog filter 10, which plays the roll of anti-background noise filter, must correspond, in the case of the invention, to particular characteristics which will be mentioned further on. When the installation is intended to receive several input signals, it may then comprise multiplexer 12 which drives a sample and hold circuit 14. The successive samples provided by the sample and hold circuit, at a rate which is generally the same for all the inputs, are digitalized by an analog/digital converter 16 and fed to a transmitter 18. The assembly of components 10-18 may form a central measuring unit whose results are stored in a memory 20 or fed directly to a receiver 22. In the first case, it is possible to work with a time-lag. But, whatever the solution selected, receiver 22 feeds a computer 24 providing data expansion by interpolation so as to restore, from samples taken at rate $F_e$, samples at a frequency which is a multiple of the preceding one, comprising, in addition to the original samples, samples obtained by interpolation. The whole of the samples is applied to an editing device 26 which may be digital (storage unit, printer providing a table of values, ... ) or analog and ensuring additional linear or polynomial interpolations (plotting table, oscilloscope, ... ).

The priciples of the digital filtering interpolation method will now be described which is applied to the samples at, at rate $F_e$ (so having a periodic spectrum of period $F_e$), of a signal with band B, defined by the limit frequency $F_m$.

Only non recursive digital filters with finite pulse response or "RIF" filters will be used, which have the advantage of being easily produced with a linear phase response and which are stable because of the non recursive character.

A filter of this type is characterized by the number N of its coefficients $a_i$, i varying from 0 to N−1, which forms its pulse response. The amplitude transfer function H(f) of the filter is then written:

$$H(f) = \sum_{i=0}^{N-1} a_i e^{-j2\pi f i T_e}$$

$T_e$ being the sampling period.

If the coefficients are symmetrical, H(f) may be written in the simplified form:

$$H(f) = G(f) \exp[-j(2\pi F\alpha + a)]$$

In this formula, G(f) is a real function, $\alpha$ and a are two constants, $\alpha$ representing the propagation time of the filter, equal to a whole number multiple of the half sampling period. As a general rule a filter will be chosen whose number of coefficients N is uneven so that the symmetry is positive and so that the propagation time is a whole number multiple of a sampling period.

Figures 2A, 2B:
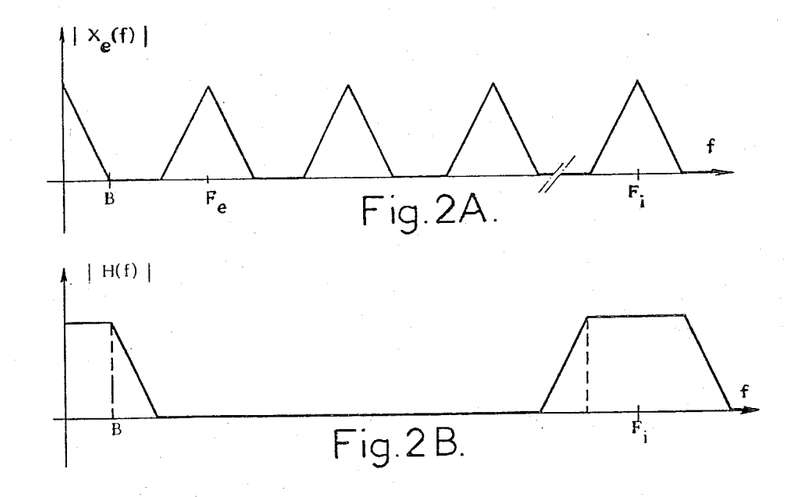
FIGS. 2A, 2B and 2C are diagrams for showing the operating principle of a digital interpolation filter and shows respectively the periodized spectrum $|x_{e(f)}|$ obtained after sampling at the frequency $F_e$, the amplitude response $|H(f)|$ of the low-pass filter used after fictive resampling of the signal at a whole number multiple K of the frequency $F_e$ and the spectrum obtained after sampling at $F_i$ and filtering (Fi=K Fe)
Figure 2C:
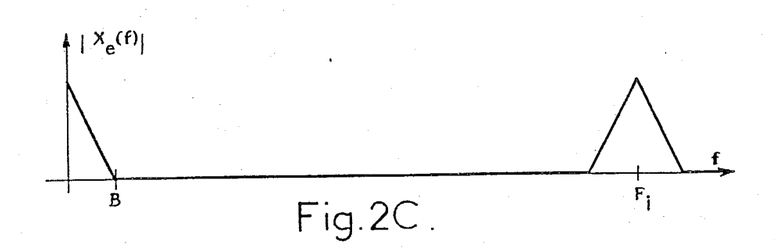

Interpolation by using such a filter aims at reconstituting, from the periodized spectrum by sampling at frequency $F_e$ (FIG. 2a), the original signal, or at least samples at frequency $F_i = KF_e$ (K being a positive integer). For that the sampled signal is fictively oversampled at frequency $F_i$ by introducing K−1 zeros between each pair of samples recorded before subjecting the new set of samples to low pass filtering whose response $|H(f)|$ is that given in FIG. 2b. Sampling at rate $F_i$ of the signal already sampled at rate $F_e$ causes a second periodization of the spectrum about the frequency $F_i$ which introduces a multiplicative factor (K−1) into the basic band spectrum. The spectrum obtained after this sampling frequency $F_i$ and low pass filtering is therefore not reduced to the basic band spectrum of the input signal x(t). It comprises periodic components about the multiples of $F_i$ (FIG. 2c). But these high frequency components are readily removed by the analog filtering operation performed during the graphic representation of the signal. It might be thought that the simple solution would consist in carrying out the interpolation operation (introduction of zeros and low pass filtering) in a single step. For that, from the set of N primary samples effectively taken:

$$E = [x(t), x(t+T_e), x(t+2T_e) \ldots x(t+iT_3) \ldots x(t+(N-1)T_e)]$$

We pass through an intermediate set:

$$E_I = [x(t), O, O, \ldots, \underbrace{O, x(t+T_e), O, O, \ldots\ldots, x(t+iT_e)}_{(K-1)},$$

$$O, \ldots O, \ldots x(t+(N-1)T_e)]$$

and this intermediate set is subjected to digital filtering whose transfer function is that of the low pass filter width B, the set $E_I$ being interpreted as a sampling at $F_i$ of the signal sampled at $F_e$.

Thus we arrive at a set $E_S$ of K xN secondary samples:

$$E_S = \left[ x(t), x\left(t + \frac{T_e}{K}\right), x\left(t + 2\frac{T_e}{K}\right), \ldots x(t+iT_e), \right.$$

-continued $$x\left(t + iT_e + \frac{T_e}{K}\right), \ldots x(t + (N-1)T_e)]$$

Figure 3A:
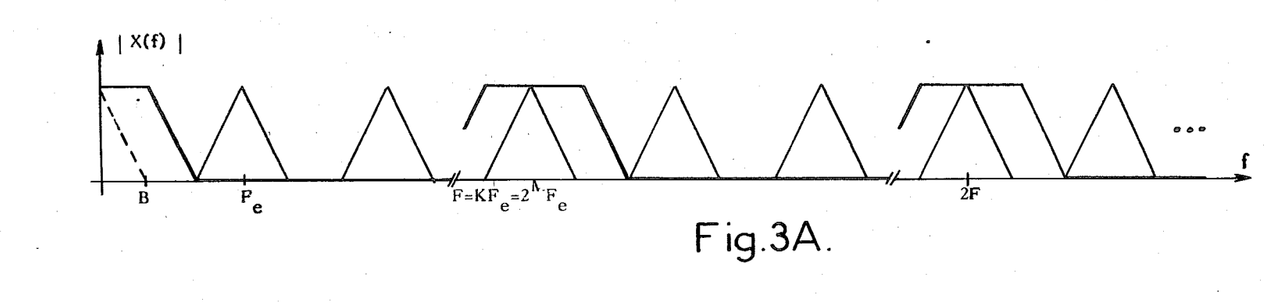
FIGS. 3A, 3B and 3C, similar to FIGS. 2, show the steepness which would be required of the transition band in the case of a single interpolation step.
Figures 3B, 3C:
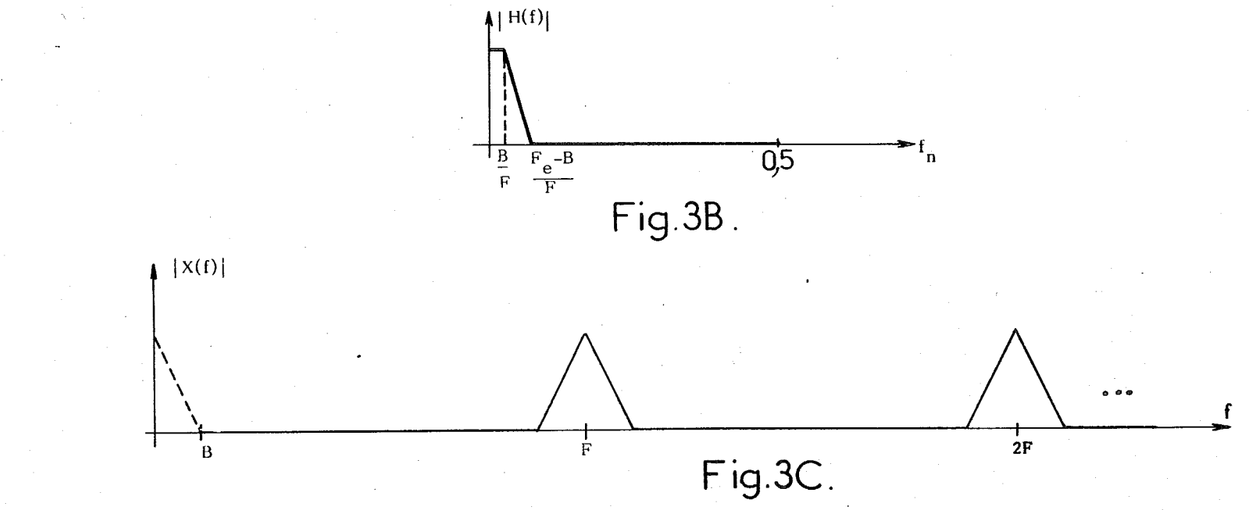

But an analysis of the construction of such a filter shows that it must remove all the components having a frequency between B and F−B (F being the desired rate after interpolation). The transfer function |H(f)| of the filter must be then that shown in FIG. 3b for the sampling shown in FIG. 3a. The relative transition band (zone between the pass band and the cut off band) must be very low or, in other words, the filter must have a high cut off steepness if spectrum bending is to be avoided. Now, such a filter is difficult to produce and requires a high number of coefficients.

This difficulty is overcome by carrying out the interpolation in several successive steps, each corresponding to a multiplication of the number of samples, which leads to what may be called multirate filtering. As will be seen further on, the low pass filters used in this case may have a relative transition band much greater than that of a single filter and may operate on a much smaller number of samples.

Figure 4A:
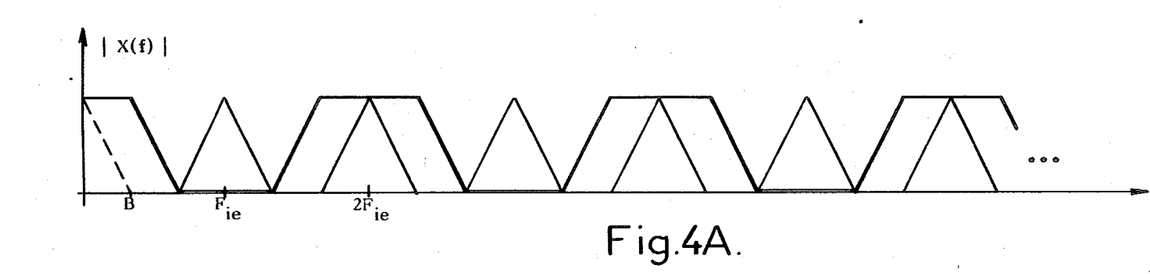
FIGS. 4A, 4B and 4C, again similar to FIGS. 2, correspond to an interpolation step with introduction of a single zero between two successive samples.
Figure 4B:
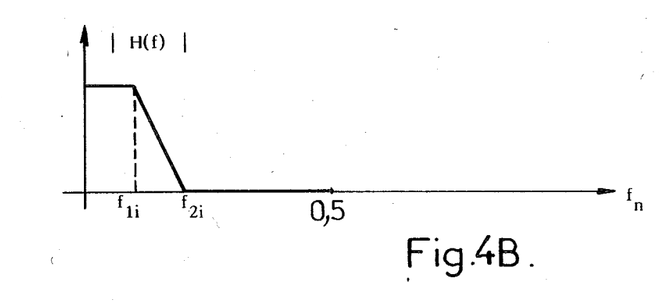
Figure 4C:
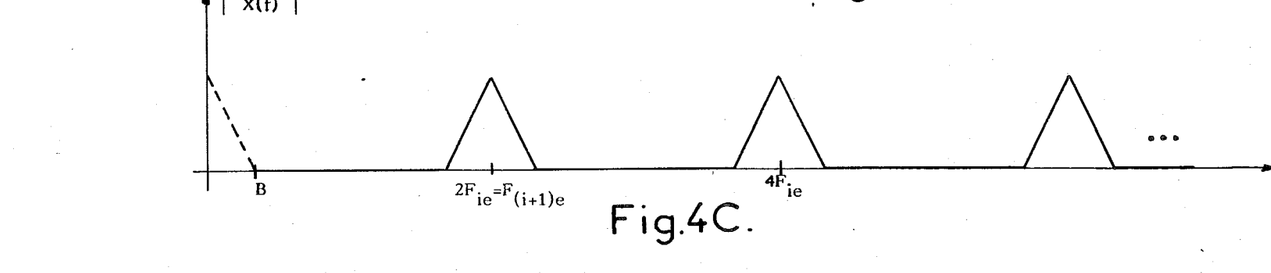

A simple solution, shown in FIGS. 4, consists in introducing a single zero between two consecutive samples in each step, then in filtering the signal thus obtained. Then the same operations are begun again so as to arrive finally, after m steps, at the sampling frequency F:

$$F = S^M \cdot F_e$$

FIGS. 4a, 4b and 4c correspond to the step of order i, in which the sampling frequency is $F_{ie}$.

As was mentioned above, the anti fold analog filter for removing background noise, may obviously have perfect characteristics, i.e. a perfectly flat amplitude response in the pass band and zero in the cut off band, with a transition over a zero frequency interval, and perfectly linear phase, amounting to a pure delay. Calculation shows in particular that, for a sampling frequency $F_e$ equal to three times the band B, in order to limit the noise to a value less than 1%, a cut off frequency greater than 40 dB /octave and a cut off band attenuation greater than 40 dB are required (if it is assumed that the signal plus noise sum is constant in the analysis band and outside). And, for limiting the error due to pass band deformations to 1%, this pass band must correspond to attenuation variations not of three decibels as is usual, but to 0.086 dB. The corresponding pass band reduction is very high.

For a 6 pole Butterworth filter, which provides an attenuation of 36 dB per octave in the transition zone, the 0.086 dB pass band represents 0.6 times the 3 dB pass band. The corresponding ratio is respectively 0.9, 0.1 and 0.2 for Tchebychev, Bessel and Legendre filters.

It will be seen further on that the filter must in addition have a substantially linear phase response, which generally leads to using a Bessel filter or a Butterworth filter. The pass band reduction mentioned above makes a correction necessary. It is advantageously made during the first digital interpolation filtering, the filter coefficients being calculated so as to give a transfer function the reverse of that of the input filter in the passing zone. It should be noted that this operation does not increase the complexity of the filter, but only assumes the precise knowledge of the characteristics of the analog input filter and an addition calculation, made once and for all.

Of course, if the noise does not correspond to the above made assumption of an homogeneous distributution in the pass band and outside, but is situated far from the cut off frequency, a filter with moderate slope in the cut off zone may be suitable, which substantially simplifies, or even removes, the problem of correction of amplitude transfer function of the analog filter.

Any non linearity in the phase response of the analog filter in the pass band also forms a source of error, and, in practice, the phase response of the filter must be linear to less than 1° in the band B of the signal analyzer. This non linearity of the phase response may however be corrected in one go by using an appropriate pass or filter situated immediately downstream of the analog filter for removing the background noise.

In practice, these restrictions will generally lead to using as analog filter:
either a Bessel filter whose cut off frequency at 3 dB is equal to B.
or a Butterworth filter whose cut off frequency at 3 dB is equal to 3B.

The order of the filter chosen will be determined by the characteristics of the noise present in the signal. This order also has an effect on the phase dispersion, as shown in the following table:

---

Order 6 Butterworth filter: dispersion of 1.2° at 0.4 times the cut off frequency, 32° at 0.9 times.
Order 3 Butterworth filter: dispersion of 0.9 to 0.4 times the cut off frequency, 16° at 0.9 times.
Order 8 Butterworth filter: dispersion of 1° at 0.4 times the cut off frequency, 41° at 0.9 times

---

This table shows that the pass band of the Butterworth filter must be substantially greater than B.

To sum up, a filter should be used with linear phase response, in practice a Bessel filter of order 5 or more, but with the disadvantage of a cut off steepness of 14 dB per octave at most, which requires connecting several filters in cascade so as to obtain a steepness exceeding 40 dB per octave and making a considerable amplitude correction, or a non linear phase response filter, which implies adding a pass-all filter, generally digital, whose coefficients are calculated so as to produce a phase response which compensates for the dispersion of that of the analog filter.

The inerpolation may be effected by an apparatus provided for this purpose, as also by a general purpose computer programmed to this end. But in any case, the flow chart P used will be of the kind shown in FIG. 5 so as to provide, from a table E(N) of N recorded samples, a file F formed of $2^K \cdot N$ samples (K being a positive integer) corresponding to the same time interval as the N original samples.

Figure 6:
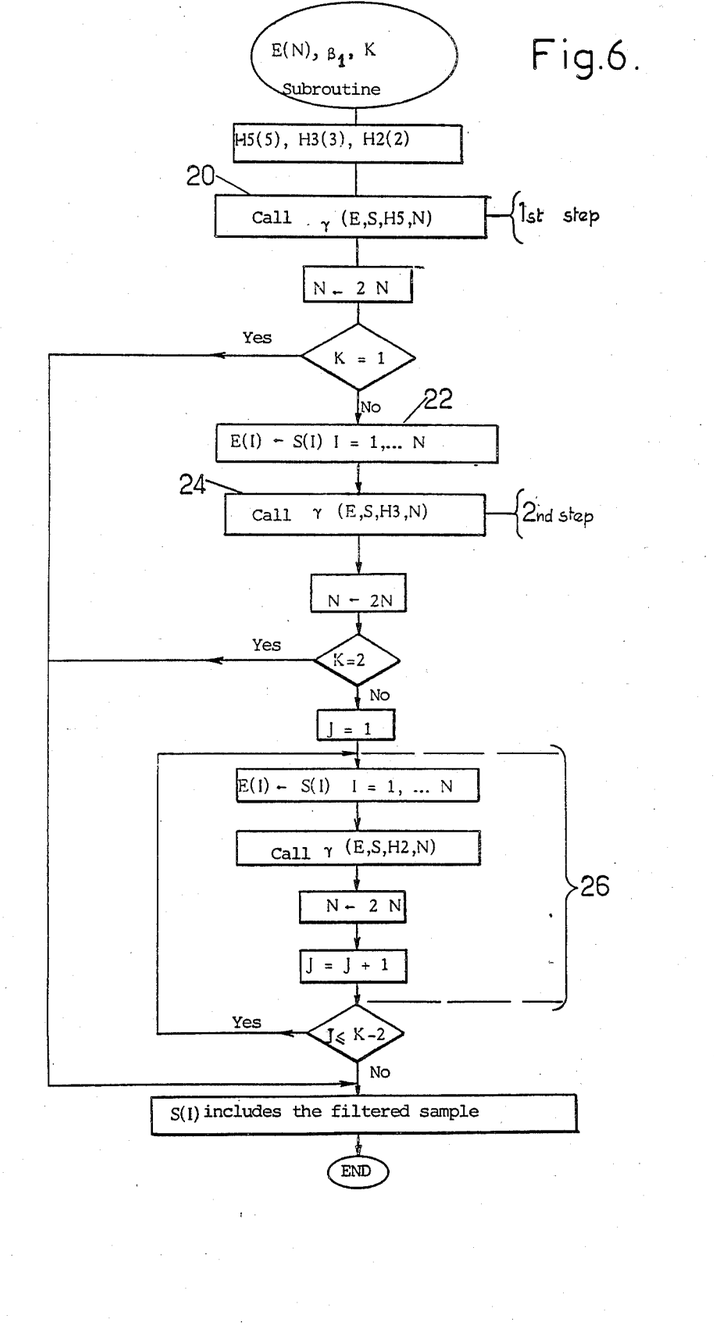

Two cases may occur, depending on whether a prior anti bending filtering correction is required or not. In the case where no correction is required or desired, a sub programme β1 is applied whose flow chart is of the kind shown in FIG. 6, which corresponds to the case of an interpolation in K steps of interpolation in a factor 2. The filtering operations are provided by RIF filters having a coefficient vector:
$H_5$ for the first interpolation
$H_3$ for the second interpolation
$H_2$ for the third interpolation and each of the following ones.

The coefficient vectors are displayed before implementing the sub progamme. These coefficient vectors may be calculated by using the optimization programme described by L. R. Rabiner and B. Gold in "Theory and application of digital signal processing", Englewood Cliffs Prentice Hall, 1975, modified for calculating the coefficients of the half band filters. By way of example, it may be mentioned that satisfactory results have been obtained by using:

in the first step, a filter with 21 coefficients (of which 10 are zero coefficients and 5 symmetrical coefficients).

in the second step, a filter with 13 coefficients (6 of which are zero and three symmetrical).

in the subsequent steps, a filter with 9 coefficients (4 of which are zero and 2 symmetrical).

When the sampling frequency is greater than 3 times the band signal, an interpolation is obtained whose accuracy exceeds $10^{-3}$ with the following coefficients:

| 1st Filter: $H_5$ | 0.035 | −.0130 | .0349 | −.0861 | .311 |
|---|---|---|---|---|---|
| 2nd Filter: $H_3$ | .0083 | −.05515 | .2969 | | |
| 3rd Filter and following: $H_2$ | −.0329 | .28285 | | | |

Figure 7:
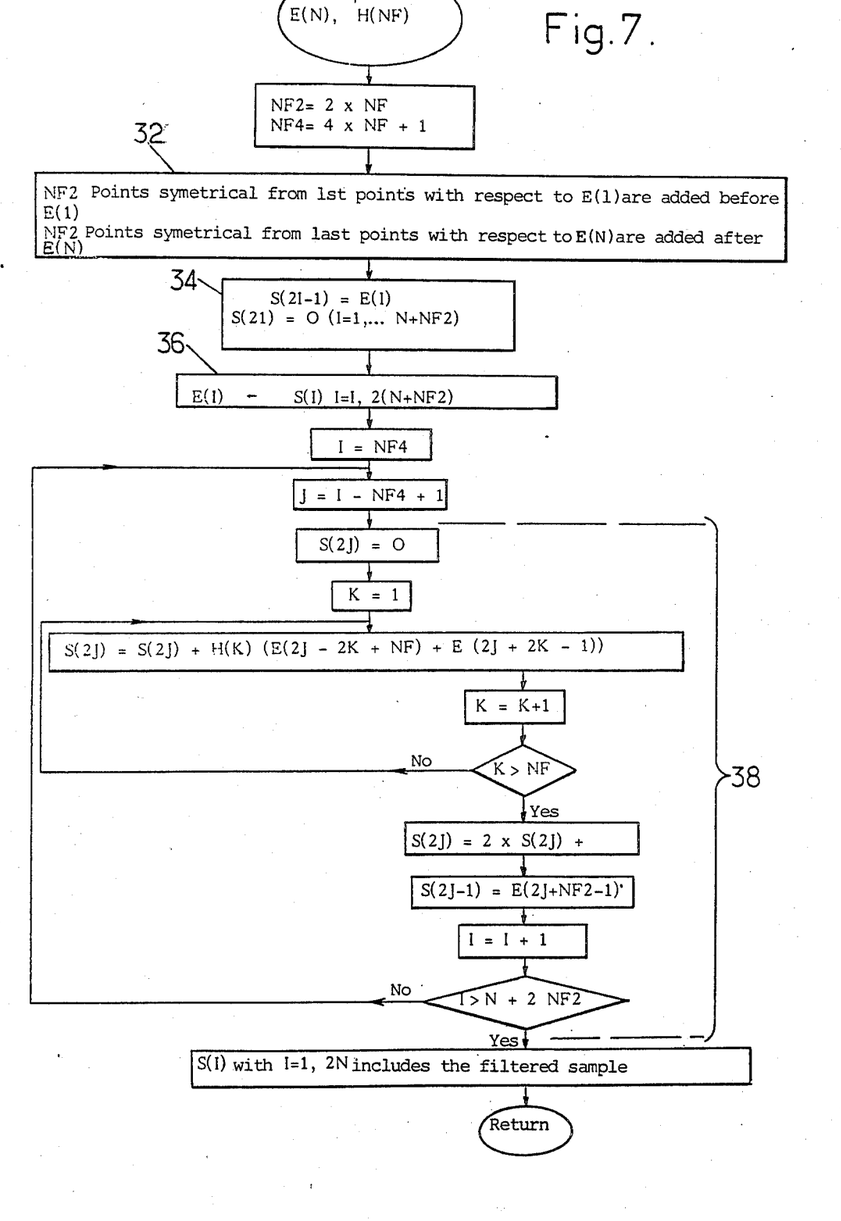

Each step corresponds to the application of a routine whose flow chart is given in FIG. 7. The first interpolation step (phase 20) uses the coefficient vector $H_5$. A test is applied. The progamme continues if the value of K originally displayed is greater than 1. The table of samples obtained after the first interpolation step is substituted for the original samples (FIGS. 22). The routine $\gamma$ is again applied (phase 24) and the program continues until the number of interpolation provided for at the outset has been effected, each of the interpolations from the third one being effected with the same coefficient vector $H_2$ and corresponding to the sequence 26.

Figure 5:
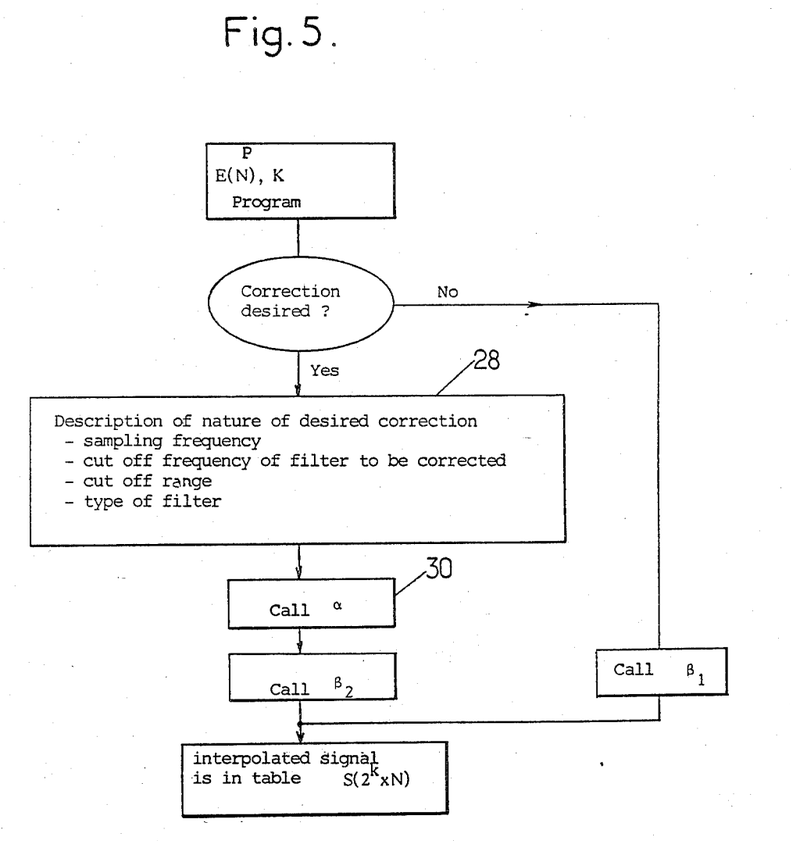
FIGS. 5, 6 7 and 8 are programs.
Figure 8:
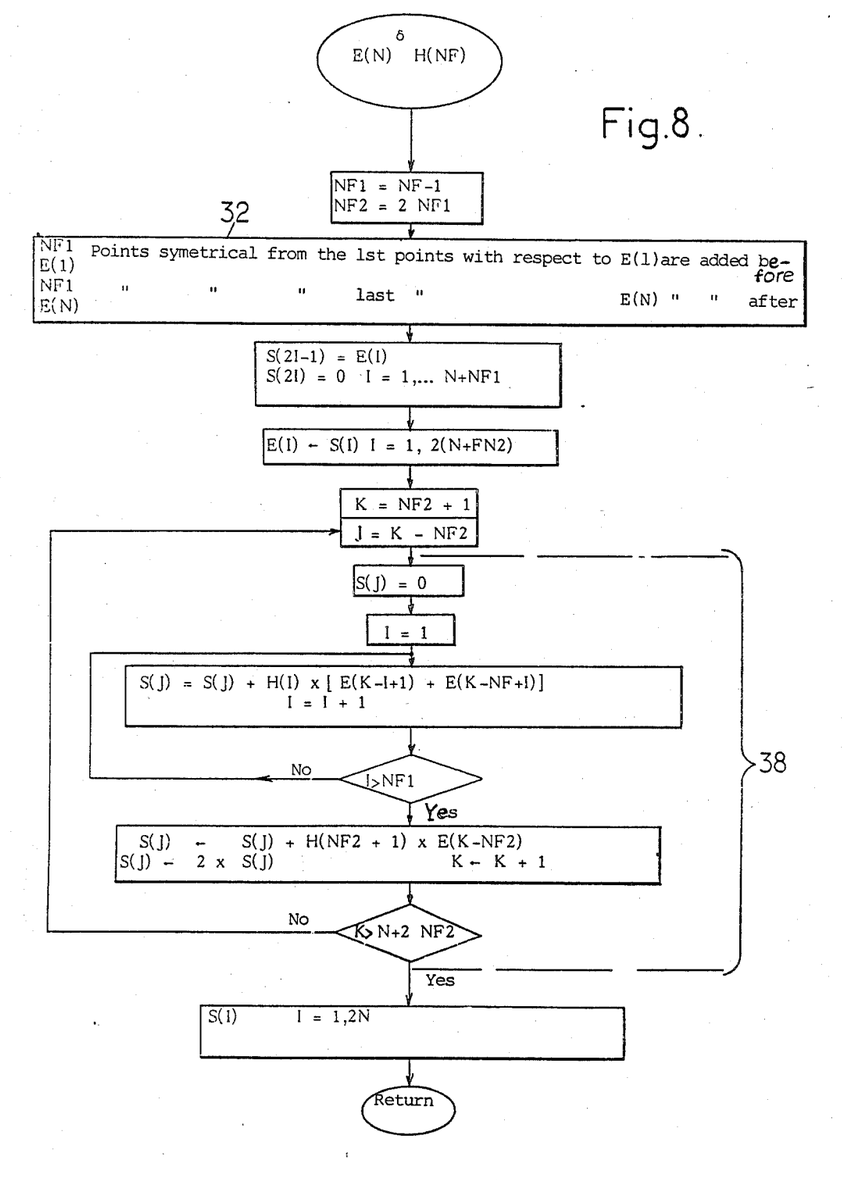
Figure 9:
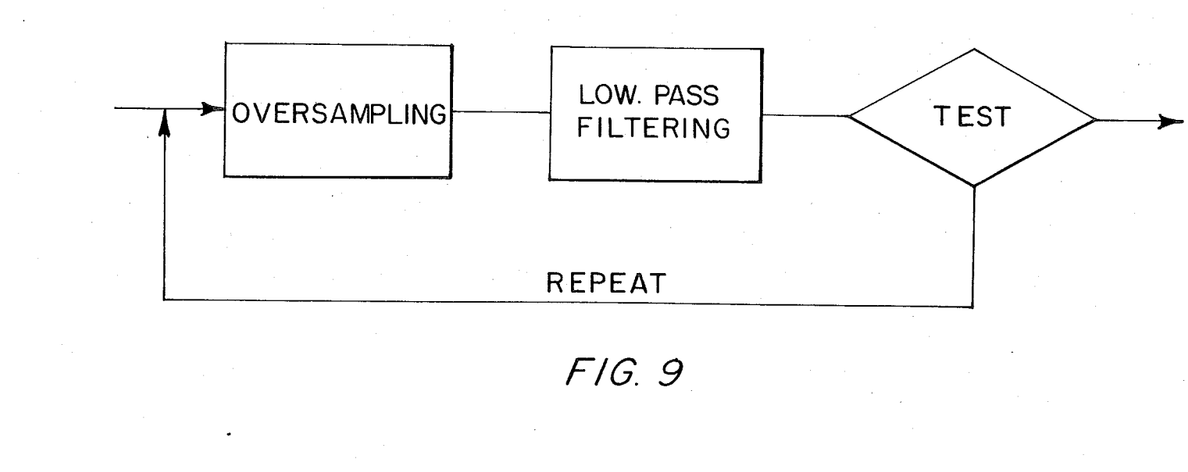
FIG. 9 is a schematic flow sheet illuminating the oversampling and low pass filtering steps of the process.

If on the contrary a correction is necessary, its characteristics are displayed (phase 28 in FIG. 5). The nature of the correction is identified by the sampling frequency, the cut off frequency of the analog filter to be corrected, the cut off range and the type of filter. From these parameters the coefficients of the first interpolatin step must be calculated, which coefficients will be substituted for the vector of coefficients $H_5$ of the program $\beta 1$. Calculation of the coefficient takes place by calling up a routine $\alpha$ (phase 13 FIG. 5). This routine may be formed by the program of MacClellan, Parks and Rabiner (IEEE Transactions on Audio and Electroacoustics, 1973), adapted to the particular problem set here and completed so that there is immediate transfer of the coefficients calculated in the first step of the sub program $\beta 2$. This latter is identical to program $\beta 1$, except that the routine $\delta$ (FIG. 8) is substituted for the routine $\gamma$ during the first interpolation step.

The routine $\delta$ corresponds to the use of a filter with symmetrical pulse response of any type, in which the total number of coefficients is this time equal to $2NF-1$. In other words, it is a question of a symmetrical filter having a priori no zero coefficient.

The routines $\gamma$ and $\delta$ are very similar. There is each time addition of $NF_1$ (or $NF_2$) symmetrical points of the first points with respect to $E(1)$ and of the last points with respect to $E(N)$ so as to avoid the edge effects (phase 32). Then zero is inserted between each initial point (phases 34 and 36). The filtered samples are then calculated (sequence 38) by using all the symmetries and the nullity of certain coefficients and values of the signal in the case of routine $\gamma$. In the routines, N designates the number of samples to be filtered, NF the minimum number of coefficients to be provided for retrieving the whole of the coefficients of the interpolating filter to be applied; H(i), with $I=1, \ldots, N$ designates the coefficients of the filter to be applied and E(I) designates the samples to be filtered.

It should be noted in passing that the vector of the coefficients H(NF) of the routine $\gamma$ has $(4NF+1)$ coefficients, but that all these coefficients are reconstituted from NF basic coefficients, by symmetry in a first step and because one coefficient out of two is nul and because the median coefficient is always equal to 0.5.

If we designate the coefficients by $a_i$, the half band interpolation sub program calculates:

$$S_j = \sum_{i=1}^{4NF+1} a_i \cdot e_{j-i} \tag{1}$$

In this formula, $e_i$ designates the samples provided by the preceding interpolation step or the samples recorded during the first step, between which the zeros have been inserted. This formula is obviously simplified because $e_{j-i}$ is nul one time out of two, because some of the $a_i$ are nul and the others symmetrical two by two.

In the case where the interpolation filtering is preceded by digital pass-all filtering whose coefficients are provided so as to produce a phase response which compensates for the dispersion of the analog filter, the coefficients of the first interpolation stage (routine $\delta$) may be provided for compensating for the amplitude distortion of the pass-all filter, at the same time as the amplitude transfer function of the low pass analog filter.

The coefficients of the digital correction pass-all RIF filter will be chosen to provide unit gain and supply a phase $\Psi_c(f)$ which compensates for the dispersion of the phase $\Psi(f)$ of the filter to be corrected, with respect to the straight line $D(f) = 2\eta f \tau$. The transfer function $F_n(f)$ of the filter must then be:

$$F_N(f) = \exp(j\Psi_c f)$$

where $$\Psi_c(f) = D(f) - \Psi(f).$$

The calculation of the coefficients follows therefrom by a conventional procedure, such as the one descibed by D. Anouar in "Conception et réalisation d'un filtre numérique", TELECOM 1981. A filter with 49 coefficients is sufficient when the phase dispersion does not exceed 1°.

The process of the invention may also be used for resetting input signal channels with respect to each other whose sampling is effected at a different time. This case is the one shown in FIG. 1 where several input channels are applied to the same multiplexer 12 driving the same disabling sampler 14. It is sufficient in this case to effect an interpolation of a sufficiently high order K in order to have, in each channel, the value of the input signal at the same time common to all channels. With this expansion of the signal, the use of a disabling sampler per channel may frequently be avoided, which represent a substantial saving.

What is claimed is:

1. A process for analyzing and retrieving an analog signal having a band B, comprising the steps of:

(a) sampling the analog signal between 2.5 and 5 times band B to obtain samples at a rate ($F_e$);

(b) inserting a plurality of zero-valued samples between the existing samples, one zero-valued sample being inserted between the samples of each pair consisting of two successive ones of existing samples;

(c) subjecting the set consisting of the existing samples and zero-valued samples to digital low pass filtering for isolating band B; and (d) repeating steps (b) and (c) until a predetermined sample rate has been obtained, said step (c) being carried out with a number of coefficients which is lower each time step (c) is repeated until step (c) has been repeated a predetermined number of times.

2. A process according to claim 1, further comprising the preliminary steps of:

low pass filtering of the analog signal with an amount of phase dispersion; and digital pass-all filtering with a transfer function in band B of said analog signal which compensates for said phase dispersion.

3. A process according to claim 1, further including a preliminary step of low pass filtering of the analog signal with some amount of phase dispersion, wherein step (c) is carried out once in such conditions as to compensate for amplitude dispersion of said analog low pass filtering.

4. A process according to claim 2, wherein said preliminary step of low-pass filtering is carried out with a phase response which is linear within one degree throughout band B.

5. A process for analyzing and retrieving an analog signal having a band B, comprising the steps of:

(a) sampling the analog signal at a rate ($F_e$) between 2.5 and 5 times band B to obtain samples at said rate ($F_e$)

(b) inserting a plurality of zero valued samples between the existing samples, one zero-valued sample being inserted between each pair of existing samples constituting of two successive ones of said two samples;

(c) subjecting the set consisting of the existing samples and added zero-valued samples to digital low pass filtering for isolating band B (d) and repeating the sequence consisting of steps (b) and (c) a plurality of times, said digital low pass filtering being carried out with a filtering function having an odd number of coefficients consisting of a mid coefficient and other coefficients, the mid coefficient being equal to 0.5 and all other coefficients being distributed in pairs which are symmertrical with respect to the mid coefficient, the two coefficients of each said pair having equal values and some of said other coefficients being equal to zero.

6. A process according to claim 5, wherein the signal is sampled during step (a) to obtain samples at a rate greater than three times the band of the signal and digital low pass filtering is carried out once with twenty one coefficients, then once with thirteen coefficients and later with nine coefficients.

7. Apparatus for analyzing and retrieving an analog signal, comprising:

an analog low-pass input filter connected to receive said analog signal and to deliver a filtered signal having a band pass B, an analog/digital converter connected to receive the output of said analog low-pass input filter and arranged for delivering, on an output, samples of said signal at a rate between 2.5 and 5 times band B, and an interpolation device connected to receive the output of said converter and arranged to repeat a sequence consisting of: inserting one zero-valued sample between the two samples of each pair of successive existing samples for increasing the number and samples; and subjecting the set consisting of existing samples and added zero-valued samples to digital low pass filtering, with a number of coefficients which is lower each time the sequence is repeated.

8. Apparatus according to claim 7, for analyzing and retrieving a plurality of analog input signals delivered to said apparatus over different channels, further comprising a multiplexer having a plurality of inputs connected to receive said plurality of input signals and an output connected to said analog digital converter, wherein the interpolation means are arranged for carrying out an interpolation of a sufficiently high order for supplying each channel the value of the corresponding signal at the same time common to all the channels.

* * * * *